F. SEEBER.
AUTOMOBILE AND OTHER VEHICLE LOCK.
APPLICATION FILED MAR. 7, 1914.
1,115,592.
Patented Nov. 3, 1914.
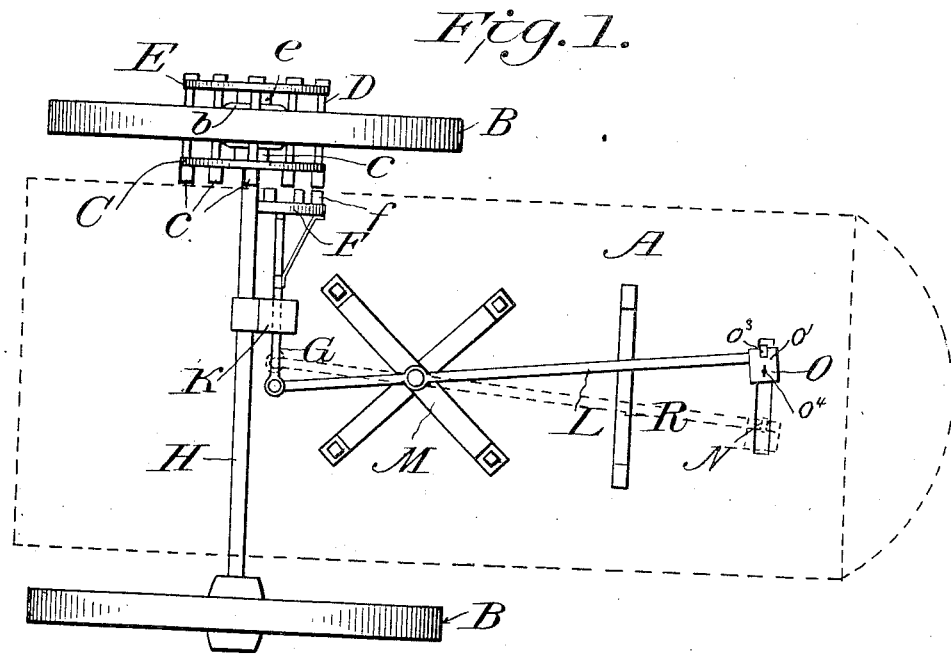
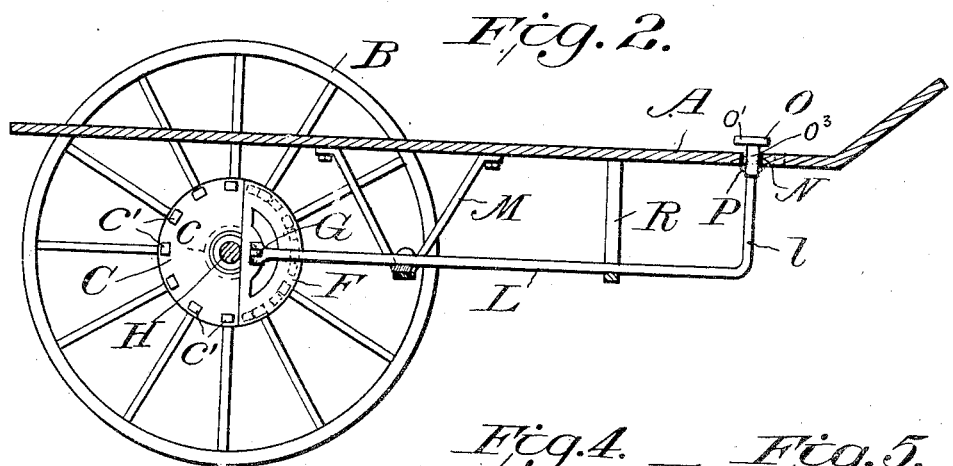
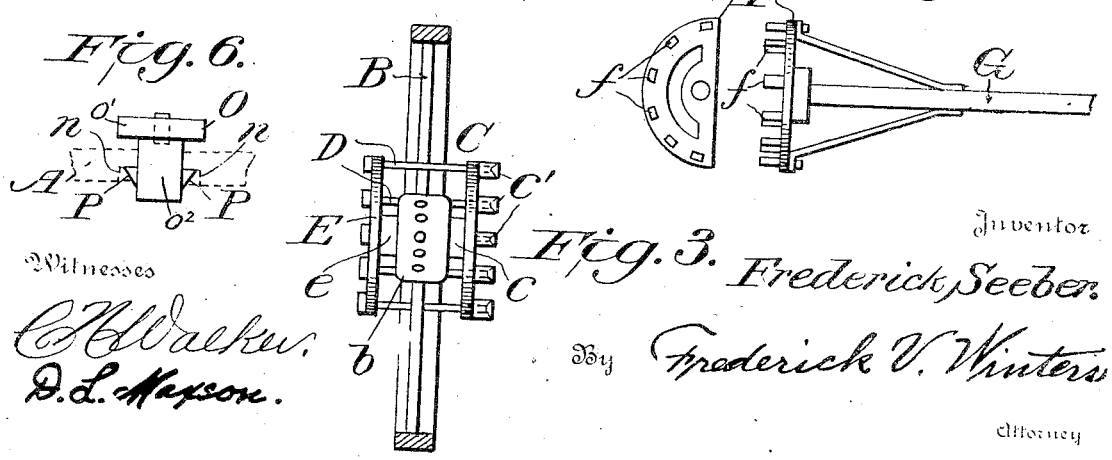
Witnesses
C. H. Walker.
D. L. Maxson.
Inventor
Frederick Seeber.
By Frederick V. Winters
Attorney

UNITED STATES PATENT OFFICE.

FREDERICK SEEBER, OF NEW YORK, N. Y.

AUTOMOBILE AND OTHER VEHICLE LOCK.

1,115,592.  Specification of Letters Patent.  Patented Nov. 3, 1914.

Application filed March 7, 1914. Serial No. 823,223.

*To all whom it may concern:*

Be it known that I, FREDERICK SEEBER, a citizen of the United States, residing at New York, in the county and State of New York, have invented certain new and useful Improvements in Automobile and other Vehicle Locks, of which the following is a full, clear, and exact specification.

This invention relates to locks for automobiles or other vehicles for preventing such vehicles from being run off or stolen by unauthorized persons.

The invention has for its object to provide a lock of this character which is positive in its action, easy to operate, and which may be readily attached to any ordinary automobile or vehicle.

Other objects will become apparent as the description proceeds.

The invention will be first hereinafter described in connection with the accompanying drawings, which constitute a part of this specification, and then more specifically defined in the claims at the end of the description.

In the accompanying drawings, wherein similar reference characters are used throughout the several views to designate corresponding parts: Figure 1 is a plan view of a lock mechanism made in accordance with my invention and applied to one of the wheels of a vehicle, the view being taken from above looking downward, and the outline of the platform of the vehicle being indicated in dotted lines. Fig. 2 is a longitudinal vertical section of the vehicle platform, showing the lock mechanism in side elevation. Fig. 3 is a detailed view of the fixed member of the lock attached to the vehicle wheel, Fig. 4 is a detailed end view of the movable member of the lock, Fig. 5 is a side view of the same together with a portion of the rod by which said member is carried, and Fig. 6 is a detailed view of the lock for securing the lever against swinging.

Referring more particularly to the drawings, A designates the platform of an automobile or other vehicle, and B the wheels supporting the rear end thereof. All the other parts of the vehicle are omitted for the sake of clearness inasmuch as they contribute nothing to the operation of my improved lock mechanism.

One member of the lock, which will be hereinafter referred to as the "fixed member" comprises a ring C secured to the inside of one of the wheels B concentric with its hub $b$ by means of bolts D passed through said ring C, between the spokes of the wheel, and through another ring E on the outside of the wheel. The ring E has a plane flat outer face while on its inner face it has a collar $e$ fitted around the outer end of the hub $b$ of the wheel. The ring C also has a collar $c$ on its inner face to fit around the inner end of the hub $b$, while on its outer face, with respect to the wheel, it carries a series of spaced angular or square lugs or cogs $c'$. By means of the bolts and the outer ring E, the ring C is firmly clamped to the hub, while the arrangement of the bolts between the spokes of the wheels provides against a possible turning of said ring C with respect to the wheel.

The movable member of the lock mechanism consists of a semi-circular plate or disk F mounted on a movable rod G so as to occupy a plane parallel to the ring C. This movable member has a series of spaced angular or square lugs or cogs $f$ extending toward the ring C and adapted to interlock or mesh with the cogs $c'$ on said ring C when the member or plate F is moved in the proper direction by the means which will now be described.

The rod G, as shown, extends parallel with the axle H on which the wheels B are mounted, and said rod is guided to move longitudinally in a strap K on said axle. To the end of said rod is pivoted one end of a lever L which is pivoted at an intermediate point to a hanger or bracket M suspended from the platform A of the vehicle. The other end of said lever is bent upward, as at $l$ and projects through a transverse slot N in the platform. A suitable locking device O is carried by the end of said lever which projects through the slot N, whereby said lever may be securely fastened in either a locked or unlocked position. As shown, this locking device consists of a hinged leaf $o'$ having a block $o^2$ rigidly fixed to its under face and adapted to be inserted into the slot N. Said block $o^2$ carries an automatic spring lock comprising oppositely extending bolts P, similar to the ordinary rolltop desk lock, and designed to snap into locking engagement with notches $n$ in the walls of the slot N at the lower edges thereof, as shown in Fig. 6. The leaf $o'$ is hinged to the end of the lever L at $o^3$ so as to swing about said lever in a plane transverse thereto. To withdraw the bolts P, a key is inserted in the key-hole $o^4$ and, after said key has been turned to retract said bolts, said leaf is swung upward to withdraw the block $o^2$ from the slot N. The lever L is then free to be moved to another position. When the desired position is reached, the leaf is swung down again, by which movement the block $o^2$ is inserted again into the slot N, and the bolts P automatically engaged in the notches $n$, thus securing the lever against accidental movement. When the locking device P is released, the lever may be moved by the foot from one end of the slot N to the other. When in the solid line position shown in Fig. 1, the movable member F will be out of mesh with the fixed member of the locking mechanism and the wheel will be free to turn and the vehicle to run. When the lever is moved to the dotted line position, however, the movable member will be interlocked with the fixed member, the lugs or cogs $f$ meshing with the cogs or lugs $c'$ on the rings C, thereby locking the wheel against turning and the vehicle from moving. The forward end portion of the lever L may be supported upon a strap R suspended from the platform of the vehicle, as illustrated in Figs. 1 and 2.

It will be observed that my locking mechanism may be readily applied to any ordinary vehicle without necessitating any radical alterations therein, the fixed member being simply clamped to the hub of one of the wheels and the lever with its supports attached to the under surface of the platform. It will also be noted that this lock is much more positive and durable than those heretofore used in which a locking bolt was projected between the spokes of the wheel, tending to mar and break said spokes.

Having thus described my invention, what I claim as new and desire to secure by Letters Patent of the United States is:—

1. A vehicle lock comprising a fixed member, a movable member adapted to engage the fixed member for locking the vehicle against running, a lever pivoted to swing in a horizontal plane below the body of the vehicle, said lever being connected to said movable member and having one end bent upward and extended through the platform of the vehicle, whereby said lever may be swung to bring the movable member into engagement with the fixed member, and means on the extended end of the lever for locking the same to the platform when said movable member is in engagement with the fixed member.

2. A vehicle lock comprising a fixed member to be attached to one wheel of a vehicle, a movable member adapted to engage the fixed member for preventing the wheel from turning, a pivoted lever to operate said movable member, one end of said lever extending up through the platform of the vehicle, a pivoted leaf on said extended end of the lever, and a spring lock on said pivoted leaf for locking the lever against swinging when the movable member is in engagement with the fixed member.

In testimony whereof I have signed my name to this specification in the presence of two attesting witnesses.

FREDERICK SEEBER.

Witnesses:
R. R. BALDRY,
MARY BALDRY.